United States Patent [19]

Agano

[11] Patent Number: 4,548,477

[45] Date of Patent: Oct. 22, 1985

[54] LIGHT MODULATING APPARATUS

[75] Inventor: Toshitaka Agano, Minami-ashigara, Japan

[73] Assignee: Fuji Photo Film Co., Ltd., Minami-ashigara, Japan

[21] Appl. No.: 379,352

[22] Filed: May 18, 1982

[30] Foreign Application Priority Data

May 22, 1981 [JP] Japan .................................. 56-78332

[51] Int. Cl.⁴ .............................................. G02F 1/11
[52] U.S. Cl. ...................................... 350/358; 358/285
[58] Field of Search ................ 350/358, 353; 358/285, 358/290

[56] References Cited

U.S. PATENT DOCUMENTS

Re. 29,670 6/1978 Spaulding .......................... 350/358
2,691,696 10/1954 Yule .................................. 358/280

Primary Examiner—Bruce Y. Arnold
Assistant Examiner—William Propp
Attorney, Agent, or Firm—Fleit, Jacobson, Cohn & Price

[57] ABSTRACT

A light modulating apparatus in which a plurality of light beams, such as laser beams, having different wavelengths are coaxially introduced into a single light modulator, and the zero-order diffracted lights of the light beams modulated by the light modulator are used as the modulated light beams for image read-out purposes or the like.

9 Claims, 3 Drawing Figures

LIGHT MODULATING APPARATUS

BACKGROUND OF THE INVENTION

1. Field of the Invention

This invention relates to a light modulating apparatus, and more particularly to a light modulator in which a plurality of coaxially introduced light beams having different wavelengths are modulated by a single light modulator.

2. Description of the Prior Art

In a system for reading out image information on an original for example by scanning the original with a light beam such as laser beam and detecting the intensity of light reflected from the original, it is necessary to use a plurality of laser beams having different wavelengths, for example red (R), green (G) and blue (B), for the purpose of reading a color original. On the other hand, it is known to use sharp beams (for example beams having a diameter of 25 µm) and unsharp beams (for example beams having a diameter of 125 µm) as the reading laser beams in the read-out of image for the purpose of generating the edge effect on the reproduced image when the image is reproduced by on-off modulating the laser beams based on the image signal obtained by the read-out operation. Namely, six laser beams consisting of the R, G and B sharp beams and the R, G and B unsharp beams are used to read out the image. Usually, these laser beams reflected from the original are received by a single light receiver and converted to electric signals. Thereafter, the electric signals obtained from the R, G and B sharp beams must be separated from those obtained from the R, G and B unsharp beams.

In this case, it is advantageous to modulate either the sharp beams or the unsharp in advance and to separated the modulated sharp or unsharp beams from the unmodulated beams. Conventionally, three light modulators are generally used for the purpose of the aforesaid modulation, and the R, G and B unsharp beams are modulated for example at 4 MHz. However, the conventional modulating method is disadvantageous in that it requires an apparatus of complicated construction and is extremely expensive to conduct partially because three light modulators must be used as described above.

In the aforesaid modulation, the R, G and B unsharp beams are modulated in the same form, and usually coaxially superposed one upon another. Therefore, it is advantageous to modulate the R, G and B unsharp beams by use of a single light modulator. This is also effective to simplify the construction of the apparatus and to reduce the cost thereof.

However, when the R, G and B unsharp beams are coaxially introduced into the light modulator, the first-order diffracted lights of the R, G and B unsharp beams are emitted from the light modulator in different directions according to Bragg's condition.

SUMMARY OF THE INVENTION

The primary object of the present invention is to provide a light modulating apparatus which is inexpensive and has a simple construction.

Another object of the present invention is to provide a light modulating apparatus in which a plurality of coaxially introduced light beams having different wavelengths are modulated by a single light modulator.

The specific object of the present invention is to provide a light modulating apparatus in which a plurality of coaxially introduced light beams are modulated and coaxially emitted in the same direction.

In the light modulating apparatus in accordance with the present invention, a plurality of light beams having different wavelengths are coaxially introduced into a single light modulator, and the zero-order diffracted lights are used instead of the first-order diffracted lights as the modulated light beams for read-out purpose or the like.

As described above, the zero-order diffracted lights are used as the modulated light beams in the light modulating apparatus in accordance with the present invention. After a plurality of light beams are coaxially introduced into a single light modulator and modulated, the resulting zero-order diffracted lights are emitted coaxially with one another without using any additional means. This is practically very advantageous since all the modulated light beams can thereafter be processed in the same optical system.

DESCRIPTION OF PREFERRED EMBODIMENTS

The present invention will hereinbelow be described in further detail with reference to the accompanying drawings.

Figure 1:
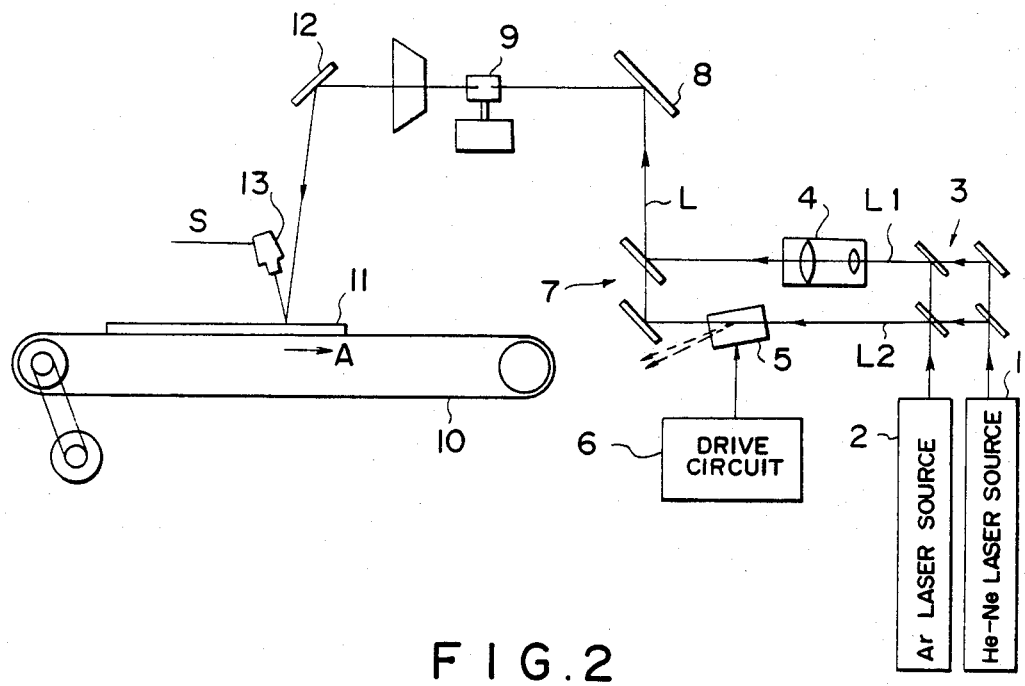
FIG. 1 is a schematic view showing the whole of an image read-out system in which an embodiment of the light modulating apparatus in accordance with the present invention is employed.

FIG. 1 schematically shows the whole of an image read-out system in which an embodiment of the light modulating apparatus in accordance with the present invention is employed.

By way of example, an He-Ne laser beam (wavelength 6328 Å) and an Ar laser beam (wavelength 4880 Å) are used as the light beams for reading out the image in the image read-out system shown.

In FIG. 1, reference numeral 1 designates an He-Ne laser source (hereinafter referred to as the first laser source) and reference numeral 2 designates an Ar laser source (hereinafter referred to as the second laser source). A splitting and superposing optical system (hereinafter referred to as the optical system) 3 consisting of semi-transparent mirrors and reflecting mirrors splits each of the He-Ne laser beam emitted from the first laser source 1 and the Ar laser beam emitted from the second laser source 2. Each portion of the split He-Ne laser beam is coaxially superposed on one of the portions of the split Ar laser beam to form a first reading laser beam L1 and a second reading laser beam L2. The second reading laser beam L2 is as such used as the unsharp beam (the second reading laser beam is hereinafter referred to as the unsharp beam). On the other hand, the first reading laser beams L1 is expanded for example to a diameter about five times larger by a beam expander 4. The first reading laser beam L1 thus expanded is used as the sharp beam (the first reading laser beam is hereinafter referred to as the sharp beam).

Figure 2:
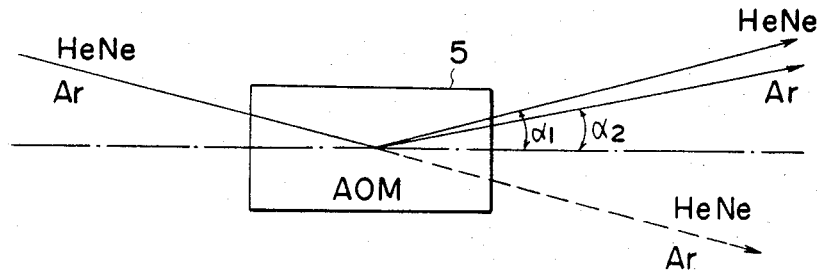
FIG. 2 is an explanatory view showing the directions of the first-order diffracted lights emitted from a light modulator when two light beams having different wavelengths are coaxially introduced into the modulator.

On the optical axis of the unsharp beam L2, a light modulator 5 in accordance with the present invention is located to modulate the unsharp beam L2 for example at about 4 MHz. The light modulator 5 is driven by a drive circuit 6. The unsharp beam consisting of the He-Ne laser beam and the Ar laser beam coaxially superposed one upon the other is introduced into the light modulator 5. In the light modulator 5, the unsharp beam consisting of the two laser beams are diffracted to yield the first-order diffracted lights in a manner safisfying Bragg's condition:

$$\sin \alpha = \lambda/2d$$

where $d = 0.1$ mm at the ultrasonic wave frequency of 40 MHz and the ultrasonic wave propagation velocity of $3.7 \times 10^3$ m/sec. Accordingly, as shown by the solid lines in FIG. 2 (wherein the zero-order diffracted light is shown by the broken line), the He-Ne laser beam having a wavelength of 6328 Å is diffracted in such a way that the angle $\alpha 1$ between the first-order diffracted light thereof and the Bragg diffraction face corresponds to an angle of diffraction of about $3.4 \times 10^{-3}$ rad. On the other hand, the Ar laser beam having a wavelength of 4880 Å is diffracted such that the angle $\alpha 2$ between the first-order diffracted light thereof and the Bragg diffraction face corresponds to an angle of diffraction of about $2.6 \times 10^{-3}$ rad. Namely, the first-order diffracted lights of the He-Ne laser beam and the Ar laser beam are emitted from the light modulator 5 in slightly different directions or in the condition involving an angular deviation therebetween. In this case, it is very difficult to coaxially superpose the two laser beams emitted in the condition involving an angular deviation therebetween. Or, a very complicated optical system is necessary to achieve this.

To eliminate the above-mentioned problem, the zero-order diffracted light is used as the modulated light in the light modulator in accordance with the present invention. The zero-order diffracted light is modulated by the light modulator 5, but emitted straightly therefrom in the same direction as when the unsharp beam L2 consisting of the two laser beams is introduced. Accordingly, when the two laser beams are introduced into the light modulator 5 in the condition superposed coaxially with each other, they are emitted therefrom in the same coaxial condition. In this case, it is not necessary to use a means for restoring the two beams to the coaxial condition.

Figure 3:
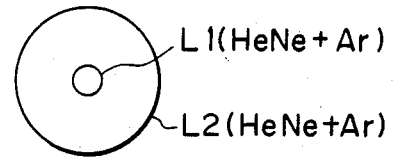
FIG. 3 is a schematic view showing the sharp beams and the unsharp beams condensed by a lens and coaxially superposed on the surface of an original to be read out.

The unsharp beam L2 modulated as described above and the sharp beam L1 are then coaxially superposed one upon the other, as shown in FIG. 3, by an optical axis matching system 7 consisting of a semi-transparent mirror and a reflecting mirror. In this way, four laser beams i.e. two sharp beams emitted from the He-Ne and Ar laser sources and two unsharp beams emitted therefrom are superposed to form a reading beam L.

The reading beam L is introduced into a deflector 9 such as a galvanometer mirror via a reflecting mirror 8. The deflector 9 directs the reading beam L through a reflecting mirror 12 to an original 11, which is moved by an endless belt 10 in the direction of arrow A, so as to scan the original 11 with the reading beam L perpendicular to the direction of arrow A. The direction of arrow A is generally called the sub-scanning direction, and the direction perpendicular to that of arrow A is called the main scanning direction. The beam L deflected by the deflector 9 is focused on the surface of the original 11 by a lens compensated for the aberration in the main scanning direction. The beam diameter D of the parallel beam of Gaussian distribution, which is introduced into the lens, is inversely proportional to the focused beam diameter d (which is also called the beam waist). Therefore, the spot diameter of the sharp beam impinging upon the original is one-fifth of that of the unsharp beam.

Above the original 11 is positioned a light receiver 13 to receive the reading beam L reflected from the surface of the original 11 and convert it to an electric original density signal S. The original density signal s output from the light receiver 13 is then separated to a sharp signal obtained from the reflected light of the sharp beam L1 and an unsharp signal obtained from the reflected light of the unsharp beam L2. This separation is done based on the difference in modulation (only the unsharp beam L2 has been modulated at 4 MHz as described above). The electric signals thus separated from each other are used for the sharpness intensification processing in the image reproduction. Namely, a sharpness intensifying signal can be generated by appropriately adding the sharp signal and the difference between the sharp signal and the modulated unsharp signal.

The present invention has been described above with respect to an embodiment of the light modulating apparatus in accordance with the present invention employed in an image read-out system. However, the light modulating apparatus in accordance with the present invention can be used in any system which can allow the known phenomenon that the zero-order diffracted light does not completely go to the off state, or in any system which can create the off state of the zero-order diffracted light.

With the light modulating apparatus in accordance with the present invention, a plurality of light beams having any combination of wavelengths can be maintained in the coaxially superposed condition without using any additional means even after the light beams are modulated. This is achieved by the use of the zero-order diffracted light as the modulated light. Accordingly, the modulated light can be processed thereafter in the same optical system.

I claim:

1. A method of reading out an image by a scanning light beam comprising the following steps:
   combining light beams of different wavelengths into a first coaxial sharp light beam;
   combining said light beams of said different wavelengths into a second coaxial sharp light beam;
   expanding one of said coaxial sharp light beams into an unsharp beam;
   passing one of the sharp beam and the unsharp beam into a single light modulator to modulate the beam at a predetermined frequency;
   providing a zero-order diffracted modulated light beam from the light beam that is modulated by the modulator;
   combining the modulated light beam with the unmodulated light beam to provide a scanning beam; and
   directing the scanning beam onto a moving original; and
   sensing the light reflected from said moving original.

2. A method of scanning a document to provide an image readout, said method comprising the following steps:

provide a plurality of light beams of different wavelengths;

splitting each of said light beams into a pair of split light beams;

coaxially superposing one of each of the split light beams corresponding to each of said wavelengths to provide a first reading light beam;

coaxially superposing one of each of the other of the split light beams corresponding to each of said wavelengths to provide a second reading light beam;

expanding said first reading light beam by passing it through a beam expander to provide an unsharp beam;

modulating said second reading light beam by passing it through a light modulator to modulate said beam at a predetermined frequency to provide a modulated sharp beam;

coaxially superposing said modulated sharp beam and said unsharp beam to form a combined reading beam;

directing said combined reading beam into a moving original to scan the original and provide a reflected reading beam; and receiving said reflected beam and providing a signal indicative of the optical density of the original.

3. A method in accordance with claim 2 wherein said expanding step is carried out to provide an unsharp beam having a diameter about five times greater than that of said reading light beam.

4. A method in accordance with claim 2 wherein said modulating step is carried out to provide a sharp beam of zero-order diffracted light.

5. A method in accordance with claim 2 including the following additional steps:

separating said signal into an unsharp signal obtained from reflected light from an unsharp portion of said combined reading beam and a sharp signal obtained from reflected light from a sharp portion of said combined reading beam; and generating a sharpness intensifying signal based upon said sharp signal and said unsharp signal.

6. Apparatus for scanning a document for image density, said apparatus comprising:

a plurality of light sources for providing a pair of light beams of different wavelenths;

splitting and superposing means for splitting each of said light beams into a pair of split light beams and for coaxially superposing one of the split light beams corresponding to one of said wavelengths with a split light beam corresponding to the other of said wavelengths to provide a first reading light beam and for coaxially superposing the another of the split light beams corresponding to one of said wavelengths with another split light beam corresponding to the other of said wavelengths to provide a second reading light beam;

beam expander means interposed in the path of said first reading light beam for expanding said first reading light beam to provide an unsharp beam;

modulating means interposed in the path of said second reading light beam for modulating said second light beam at a predetermined frequency to provide a modulated sharp beam;

optical axis matching means for coaxially superposing said modulated sharp beam and said unsharp beam to provide a reading beam;

scanning means for scanning an original with said reading beam to provide a reflected reading beam from said original; and receiving means responsive to said reflected reading beam for providing an output signal indicative of the optical density of the original.

7. Apparatus in accordance witha claim 6 wherein said modulating means diffracts said second reading light beam and said sharp beam is defined by the zero-order diffracted modulated light.

8. An apparatus as defined in claim 6 wherein said light beams are laser beams.

9. An apparatus as defined in claim 8 wherein said laser beams are an He-Ne laser beam and an Ar laser beam.

* * * * *